United States Patent
Zahn et al.

[11] Patent Number: 5,877,107
[45] Date of Patent: Mar. 2, 1999

[54] METHOD FOR PRODUCING A CATALYTIC CONVERTER

[75] Inventors: Wolfgang Zahn, Ludwigsburg; Wolfgang Maus, Bergisch Gladbach, both of Germany

[73] Assignees: Emitec Gesellschaft fuer Emissions-technologie mbH, Lohmar; Mercedes Benz Aktiengesellschaft, Stuttgart, both of Germany

[21] Appl. No.: 717,829

[22] Filed: Sep. 23, 1996

Related U.S. Application Data

[63] Continuation of PCT/EP95/00840, Mar. 7, 1995.

[30] Foreign Application Priority Data

Mar. 21, 1994 [DE] Germany .......................... 44 09 625.9

[51] Int. Cl.⁶ ..................................... B01L 20/34
[52] U.S. Cl. .................. 502/20; 502/22; 502/56
[58] Field of Search ................... 502/20, 22, 56

[56] References Cited

U.S. PATENT DOCUMENTS 4,820,678  4/1989  Xu ........................................... 502/303
5,314,851  5/1994  Huba ........................................ 502/22

FOREIGN PATENT DOCUMENTS

| | | |
|---|---|---|
| 0241310 A2 | 10/1987 | European Pat. Off. . |
| 0472853 A1 | 3/1992 | European Pat. Off. . |
| 0566878 A1 | 10/1993 | European Pat. Off. . |
| 1905563 | 8/1970 | Germany . |
| 41 05 224 C1 | 2/1992 | Germany . |
| 41 22 717 A1 | 1/1993 | Germany . |

*Primary Examiner*—Michael L. Lewis
*Assistant Examiner*—Alexander G. Ghyka
*Attorney, Agent, or Firm*—Herbert L. Lerner; Laurence A. Greenburg

[57] ABSTRACT

A method for producing a catalytic converter including a honeycomb body having flow channels with catalytically active surfaces, includes at least partially cleaning foreign materials from a honeycomb body of a catalytic converter that has been in service. Catalytically active surfaces of the catalytic converter are restored through application of a catalytically active surface coating.

12 Claims, 3 Drawing Sheets

METHOD FOR PRODUCING A CATALYTIC CONVERTER

CROSS-REFERENCE TO RELATED APPLICATION

This application is a Continuation of International Application Serial No. PCT/EP95/00840, filed Mar. 7, 1995.

BACKGROUND OF THE INVENTION

Field of the Invention

The present invention relates to a method for producing a catalytic converter being formed of a honeycomb body with flow channels having catalytically active surfaces.

It is known in the state of the art how to apply catalytically active materials to the surfaces of the flow channels of a honeycomb body. The honeycomb body basically is formed of a metallic or ceramic support material. A porous intermediate layer (washcoat) that enlarges the active surface is typically applied to the support material. In that way, the geometrical surface of the flow channels is multiplied by several orders of magnitude. A catalytically active material is then applied on the resulting active surface. Combustion exhaust gases, e.g., from an automotive engine, are led through the flow channels and particular components of the combustion exhaust gas are converted by the catalytic action in the region of the coated surfaces, typically exothermally, so that a catalytically treated combustion exhaust gas emerges from the outlet of the flow channels.

However, the catalytic action of such a catalytic converter does not last without limit, even though the catalytically active materials themselves are not converted. That is due to various mechanisms. First of all, the combustion exhaust gas typically contains a fraction of particles (albeit slight) which can settle into the flow channels and thus reduce the active surface of the catalytic converter. In other words, the cavities of the porous intermediate layer become filled with foreign material. The free cross section of the flow channels may even remain unaffected. Often, the combustion exhaust gas also contains slight amounts of substances which inhibit the catalytic action of the catalyst materials. Deposits of such substances in the honeycomb body of the catalytic converter can result in total disabling (poisoning). Furthermore, the catalytic converter is exposed to continual mechanical stresses, namely vibrations (particularly when used in automobiles), as well as thermal expansion and contraction (from constantly changing operating conditions, especially stop and go operation). That can result in pieces of the porous intermediate layer becoming detached from the support body, which again loses part of the active surface. Finally, the high temperatures occurring in the exothermal conversion of a component of the combustion exhaust gas lead to a glazing or vitrification of the porous intermediate layer. Extremely high temperatures, for example, can be caused by incomplete combustion in the engine, so that some of the combustion occurs catalytically in the catalytic converter. The gradual glazing of the porous intermediate layer means that the combustion exhaust can no longer reach the deeper lying voids in the porous intermediate layer. The active surfaces of those voids are then no longer available for the catalytic conversion and thus diminish the total active surface.

However, the individual components of a catalytic converter have different service lives. While the catalytic material is basically unconsumed, it is gradually lost for the effectiveness of the catalytic converter in the course of its operating life, for the above-given reasons. Thus, the effectiveness of the catalytic converter is primarily determined by the integrity of the porous intermediate layer. In particular, at the time when the catalytic converter has to be replaced in the automobile, by reason of legal requirements, for example, the support body is still intact. In particular, metal support bodies can have a service life that is often twice as long as that of the porous intermediate layer.

The still young technology of catalysts for motor vehicles has established thus far that the service life of the catalytic converter is considerably less than the service life of the motor vehicle in which the catalyst is installed. The service life of the catalyst until recently corresponded to only around 50,000 km of vehicle mileage. It is common practice to subject a catalytic converter at the end of its service life to a process by which the noble metals can be recovered. Examples of such processes will be found in German Published, Non-Prosecuted Patent Applications DE 41 05 224 A1 and DE 41 22 717 A1. The proposed methods concentrate on recovering the noble metal components, since they represent a not inconsiderable value. However, the other metal components can also be subjected to recycling.

SUMMARY OF THE INVENTION

It is accordingly an object of the invention to provide a method for producing a catalytic converter, which overcomes the hereinafore-mentioned disadvantages of the heretofore-known methods of this general type and which not only keeps a major portion of the raw materials used in a raw material cycle, but also preserves as much as possible the expenditure of energy and labor that must be used in the production of the catalytic converter.

With the foregoing and other objects in view there is provided, in accordance with the invention, a method for producing a catalytic converter including a honeycomb body having flow channels with catalytically active surfaces, the method which comprises at least partially cleaning foreign materials from a honeycomb body of a catalytic converter that has been in service; and restoring catalytically active surfaces of the catalytic converter through application of a catalytically active surface coating.

Advantageous configurations of the method of the invention are indicated in subsidiary claims 2–8.

The invention is based on the findings of recent developments, especially in the field of catalysts with metallic honeycomb bodies, that service lives of 100,000 km or more vehicle mileage are possible. Thus, such catalysts often have longer service lives than the operation of a vehicle.

In one exemplary embodiment of the invention, a catalytic converter that was already in use is first cleaned of foreign materials. The period of use is not of critical importance in this case. In a second step, the catalytically active surfaces of the catalytic converter are restored. In this way, a catalytic converter is produced which does not differ in its functioning from a catalytic converter that was produced by a traditional method.

It is a special advantage of this method that the support structure of the used catalytic converter, especially a metallic support structure, is not destroyed in implementing the method and therefore at least the support body is available for producing a catalytic converter. Since a number of process steps are no longer necessary in the production of a catalytic converter according to the inventive method, as opposed to the traditional production methods, a considerable cost advantage can be achieved in this way.

In the preferred embodiment of the inventive method, the restoration involves an application of a catalytically active surface coating. If the integrity of the porous intermediate layer of the catalytic converter used in the method, which has already been in use, was still largely preserved, the full catalytic action of the catalytic converter can be restored in this easy way. The resulting expenditure of noble metals is not great from the stand point of economical use of raw materials, since in any case it can mostly be recovered at a later time.

In accordance with another mode of the invention, a porous intermediate layer is applied before the noble metal coating. This procedure is especially advantageous if large portions of the porous intermediate coating of the spent catalytic converter are damaged.

In accordance with a further mode of the invention, the existing coating is removed after the cleaning step. This method is especially advantageous if an existing coating on the spent catalytic converter is no longer suitable for application of a catalytically active surface coating. It has the advantage of ensuring that the original porous intermediate layer with the embedded catalytically active noble metal surface is entirely removed from the spent catalytic converter and the noble metals contained therein are recovered. A completely new coating of the catalytic converter can then be carried out according to a traditional method.

In accordance with a concomitant mode of the invention, the possibilities for the cleaning and/or removal of an existing coating include, for example, use of ultrasound, flushing the honeycomb body with a chemically or mechanically active fluid, and heat or cold treatment of the spent catalytic converter. The different possibilities can be used singly or in any given combination.

The implementation of the method according to the invention requires only a relatively low expenditure of energy and labor and differs considerably from that which must be consumed in the traditional recycling of spent catalytic converters. Furthermore, there is an advantage over the traditional production process for catalytic converters, especially those with metal support bodies, since at least the preparation of a support body is not required. Consequently, there is the advantage that the value of a catalytic converter in use is determined not only by its content of noble metals, but also by its reusability, as described above, for production of a new catalytic converter.

Other features which are considered as characteristic for the invention are set forth in the appended claims.

Although the invention is illustrated and described herein as embodied in a method for producing a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
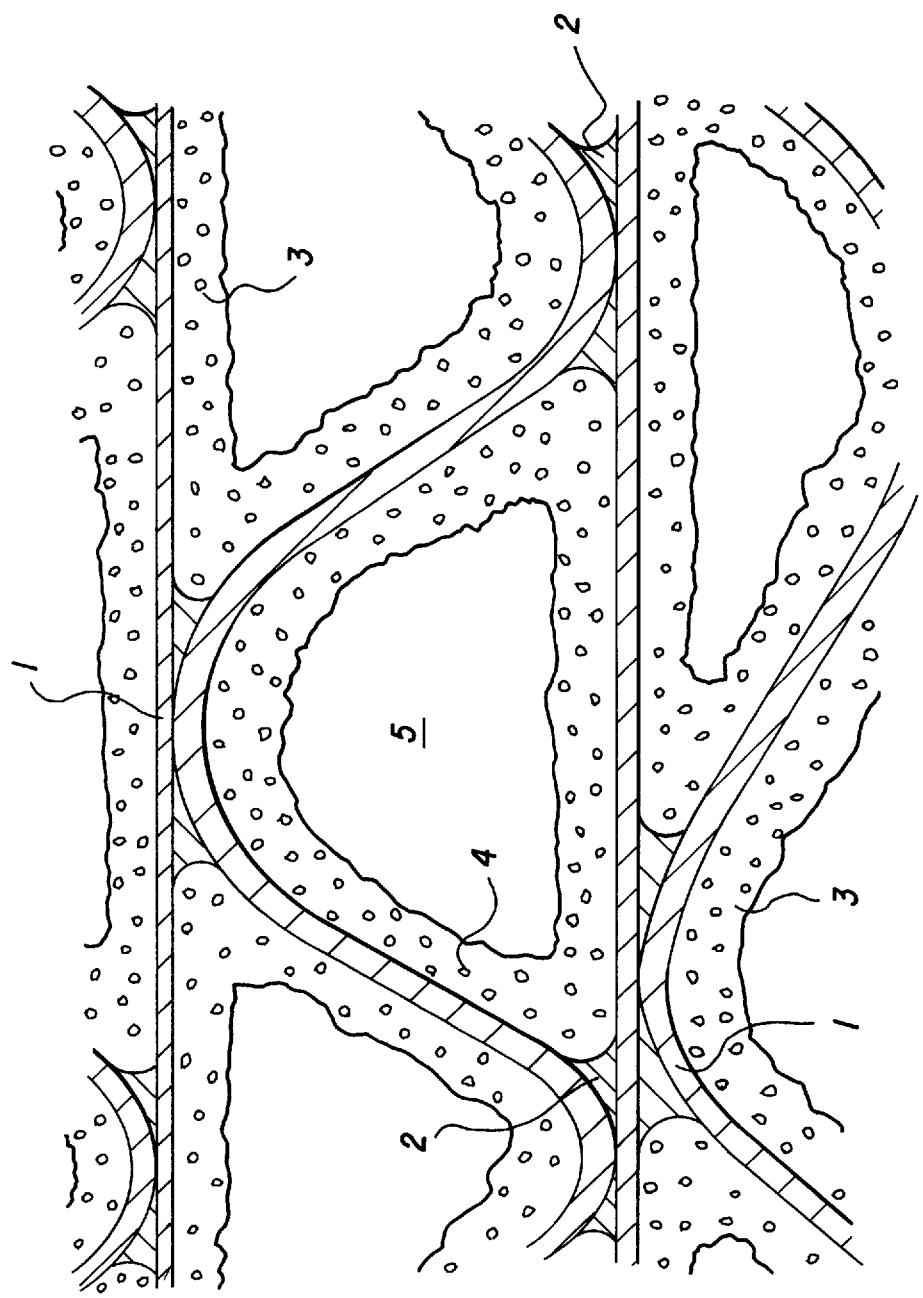
FIG. 1 is a fragmentary, diagrammatic, front-elevational view of a fully functional honeycomb body.

Referring now to the figures of the drawings in detail and first, particularly, to FIG. 1 thereof, there is seen a honeycomb body which has a metal support structure 1. The metal support structure 1 is formed of layers of alternating smooth and wavy or corrugated metal sheets. The individual layers are brazed together in the region of contact points 2 thereof. Stacking alternating smooth and wavy sheets together creates flow channels 5, through which a combustion exhaust gas can be guided. Wall surfaces of the flow channels 5 are lined or clad with a porous layer 3. The porous layer 3 has a multiplicity of cavities 4, which are directly or indirectly connected to the flow channel 5. The porous layer 3 basically serves as a support substance for a catalytically active coating. This coating is applied over the entire surface, i.e., including surfaces of the accessible cavities 4. The entire coated surface is many times larger than the inner wall surfaces of the flow channels 5 taken together. In FIG. 1, the porosity of the layer 3 is not depicted individually, but is illustrated by the pattern shown and a suggested roughness of the surface of the porous layer 3.

During operation, the combustion exhaust gas flowing through the flow channels 5 comes into contact with the entire surface of the catalytic coating, whereupon certain components of the exhaust gas are catalytically converted. The conversion is typically exothermal and therefore results in a high temperature of the honeycomb body in the region of 400° C. to 700° C.

Figure 2:
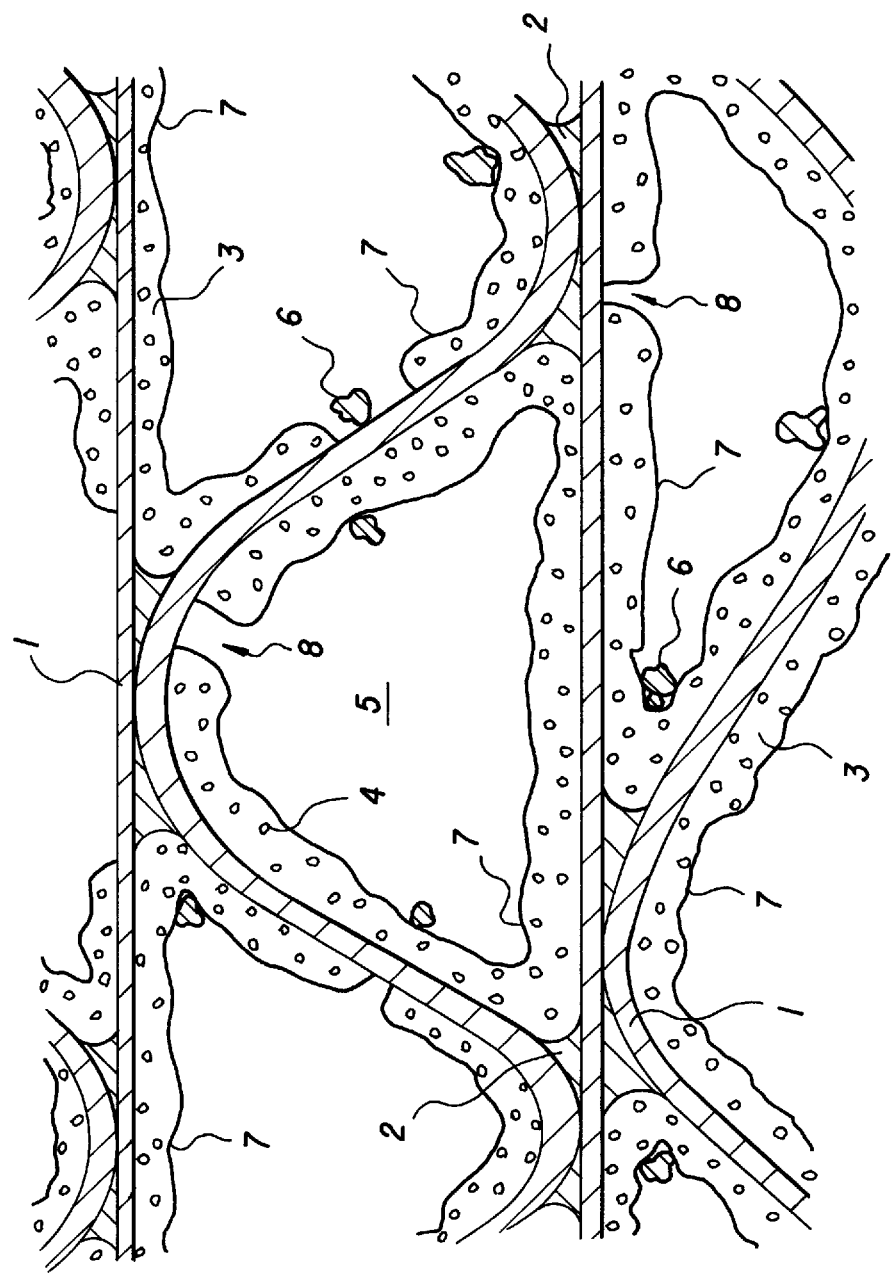
FIG. 2 is a view similar to FIG. 1 of a spent honeycomb body.

FIG. 2 shows the same partial cross section of the honeycomb body as FIG. 1, after the honeycomb body has been used for a certain time. Various locations have particles 6 of foreign materials, which are typically contained in an exhaust gas and which preferably settle in narrower sections of the honeycomb body. These particles 6 hinder the access of the exhaust gas to the deeper lying cavities 4 in the porous layer 3 and thus diminish the effectiveness of the catalytic converter. FIG. 2 also shows damaged locations 8 in the porous layer 3. These damaged locations 8 occur from various mechanical influences on the honeycomb body, by which some pieces of the porous layer 3 become detached and are carried away by the exhaust gas flow. In this way, the total catalytically active surface of the catalytic converter is decreased. Finally, FIG. 2 also illustrates that the porous layer 3 can have a glazed or vitrified surface 7 due to the action of high temperatures. This glazing 7 cuts off the connection between the deeper lying cavities 4 in the porous layer 3 and the particular flow channel 5. The result is that the catalytically active surface, although being intact, is no longer exposed to the exhaust gas. The effectiveness of such a catalytic converter can be considerably impaired thereby.

It is noted that the above-described failure mechanisms need not all occur at the same time, but rather they may also occur singly or in any given combination. It is also noted that the damage need not extend uniformly over the length of the honeycomb body. Since the catalytic conversion typically occurs preferentially in certain lengthwise sections of the honeycomb body, one can primarily anticipate an impairment in those lengthwise sections.

Figure 3:
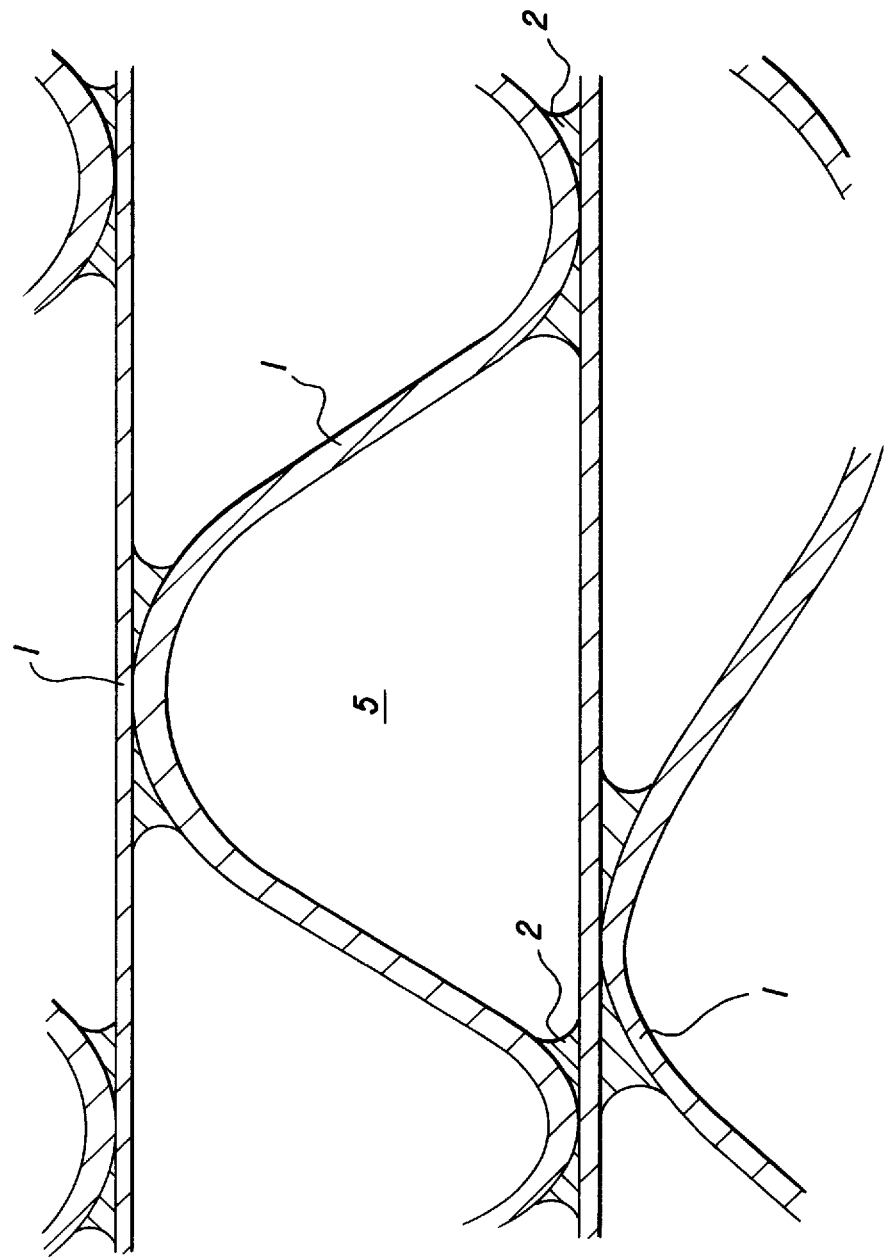
FIG. 3 is a view similar to FIG. 1 of an uncoated support body.

FIG. 3 shows a honeycomb body that has been freed from all materials by a preferred embodiment of the method, so that the honeycomb body is available as a brazed support structure 1. In order to obtain a support structure 1 according to FIG. 3, the honeycomb body is cleaned of all foreign materials and the porous intermediate layer is removed. This can be carried out, for example, with ultrasound treatment, a treatment under extreme and quickly changing temperatures, a chemical treatment and/or a treatment with liquids in which grinding particles are suspended. One can obtain a honeycomb body with structures similar to those of FIG. 1 by application of a new porous layer 3 and by subsequent coating with a catalytically active material.

We claim:

1. A method for producing a catalytic converter including a honeycomb body having flow channels with catalytically active surfaces, the method which comprises:

providing a used honeycomb body of a catalytic converter having foreign materials trapped in the honeycomb body during a service life of the honeycomb body;

cleaning the used honeycomb body to at least partially remove the foreign materials trapped by the honeycomb body; and restoring catalytically active surfaces of the catalytic converter through application of a catalytically active surface coating.

2. The method according to claim 1, which comprises applying a porous intermediate layer before the step of applying the catalytically active surface coating.

3. The method according to claim 1, wherein the honeycomb body has an existing coating and which comprises a step of removing the existing coating from the honeycomb body following the cleaning step.

4. The method according to claim 1, which comprises including a step of ultrasound treatment of the honeycomb body in the cleaning step.

5. The method according to claim 1, wherein the honeycomb body has an existing coating and which comprises including a step of flushing the channels of the honeycomb body with a fluid in the cleaning step.

6. The method according to claim 5, which comprises adding substances to the fluid for producing a dissolution of at least one of the foreign materials and the existing coating.

7. The method according to claim 5, which comprises adding chemically active substances to the fluid for producing a dissolution of at least one of the foreign materials and the existing coating.

8. The method according to claim 5, which comprises adding substances to the fluid for producing a dissolution of at least one of the foreign materials and the existing coating by mechanical action.

9. The method according to claim 1, which comprises heat treating the honeycomb body before the restoring step.

10. The method according to claim 9, which comprises flushing the catalytic converter with fluids of extremely different temperature during the heat treatment step.

11. The method according to claim 1, wherein the used honeycomb body is a used metallic honeycomb body.

12. The method according to claim 1, wherein the honeycomb body has an existing porous intermediate layer embedded with a catalytically active noble metal surface and which comprises a step of removing the existing porous intermediate layer embedded with the catalytically active noble metal surface following the cleaning step.

* * * * *